US008484274B2

(12) United States Patent
Dean et al.

(10) Patent No.: US 8,484,274 B2
(45) Date of Patent: Jul. 9, 2013

(54) OPTIMAL PADDING FOR THE TWO-DIMENSIONAL FAST FOURIER TRANSFORM

(75) Inventors: Bruce H. Dean, New Market, MD (US); David L. Aronstein, Silver Spring, MD (US); Jeffrey S. Smith, Ellicott City, MD (US)

(73) Assignee: The United States of America represented by the Administrator of the National Aeronautics Space Administration, Washington, DC (US)

( * ) Notice: Subject to any disclaimer, the term of this patent is extended or adjusted under 35 U.S.C. 154(b) by 943 days.

(21) Appl. No.: 12/549,159

(22) Filed: Aug. 27, 2009

(65) Prior Publication Data

US 2011/0055306 A1    Mar. 3, 2011

(51) Int. Cl.
*G06F 17/14* (2006.01)

(52) U.S. Cl.
USPC .......................................................... 708/401

(58) Field of Classification Search
None
See application file for complete search history.

(56) References Cited

U.S. PATENT DOCUMENTS

| | | | |
|---|---|---|---|
| 6,191,727 B1 * | 2/2001 | Springer et al. | 342/195 |
| 6,729,186 B1 * | 5/2004 | Sirrine et al. | 73/660 |
| 2002/0129313 A1 * | 9/2002 | Kubo et al. | 714/752 |
| 2002/0156822 A1 * | 10/2002 | Tanai | 708/404 |
| 2007/0165906 A1 * | 7/2007 | Han | 382/103 |
| 2008/0162767 A1 * | 7/2008 | Cho et al. | 710/305 |
| 2008/0297497 A1 * | 12/2008 | Lu et al. | 345/208 |

* cited by examiner

*Primary Examiner* — Ilwoo Park
*Assistant Examiner* — Aurangzeb Hassan

(57) ABSTRACT

Padding or adding data to a data signal can increase the speed with which a signal processor can process the data. Methods are provided herein that can accurately predict the optimal pad size of a two dimensional array of data, which can be used to increase the processing speed of a signal processor by optimizing run-time for a two-dimensional (2-D) fast Fourier transform (FFT) operation.

11 Claims, 2 Drawing Sheets

OPTIMAL PADDING FOR THE TWO-DIMENSIONAL FAST FOURIER TRANSFORM

STATEMENT OF GOVERNMENT INTEREST

The invention described herein was made by employees of the United States Government and may be manufactured and used by or for the Government of the United States of America for governmental purposes without the payment of any royalties thereon or therefor.

FIELD

The present invention relates to signal processing, and more particularly to methods of improving the processing time of a signal processor or of a cluster of signal processors.

BACKGROUND

Signal processing in various engineering and scientific fields makes use of the fast Fourier transform ("FFT"). A processor can use the FFT when it reads and writes data to and from memory. Data can be written and read to and from various memories of a computer, for example, a cache memory, a random access memory (RAM), and/or a main memory. The cache of a computer is configured to store commonly used instructions and frequently accessed data. The cache is a smaller and faster than the external memory of the computer, however, the cache typically stores a fraction of the amount of data as the external memory. Cache memories can vary from computer to computer. Some cache memories allow for a cache that is completely addressable, thus allowing a software programmer the ability to access every element in a cache. General purpose processors, however, are not addressable. The contents of the cache are determined by the hardware architecture. For a general purpose processor, the prediction of the contents of the cache are determined at run-time, thus performance is non-deterministic.

Signal processors, for example general purpose processors, are designed to internally decide which data is stored in the cache and which data is stored in external memory. When the processor needs to read from or write to a location in main memory, it first checks whether a copy of that data is in the cache. If so, the processor immediately reads from or writes to the cache, which is much faster than reading from or writing to the main memory. On the modern desktop, the signal processor on average takes from about 0.5 nanoseconds to 25 nanoseconds to access the cache. Whereas the signal processor takes from about 80 nanoseconds to 250 nanoseconds to access a main memory. The penalty for a cache miss is a combination of the access time for the cache (needed to confirm the data is not in the cache), plus the access time for the main memory.

Although counterintuitive, on some occasions a smaller data signal can take a signal processor longer to process than a larger data signal, under the same computational algorithm. One of the reasons for this is that when the signal processor processes the smaller data signal, more cache misses occur than when the larger data signal is processed. For the one-dimensional (1-D) FFT it is commonly known that padding an array of data up to the nearest power of two gives the optimal average run-time. For the two-dimensional (2-D) FFT, however, padding the data signal to a power of two does not necessarily result in the optimal run-time, and can often lead to inefficient signal processing. Therefore, a need exists for a method that can accurately predict the optimal pad size of a two dimensional array of data which can be used to increase the processing speed of a signal processor by optimizing run-time for the 2-D FFT.

A disadvantage of using a power-of-two pad size can be a longer run-time for a 2-D FFT than what is achievable when using an optimal pad size. The disadvantage of using empirically determined pad sizes is that one must perform the 2-D FFT for all data sizes to determine the most efficient pad sizes, and because of issues of non-deterministic run-times in modern desktop computer CPUs, these FFTs should be repeated numerous times to average out the timing functions. Using this approach, one would need to run a large number of 2-D FFTs for all data sizes of interest, for every computational environment on which the analysis would be performed.

SUMMARY

According to various embodiments of the present teachings, a method is provided for optimizing signal processing times. In some embodiments, unwanted smaller data signals that are not optimal in size are padded to a larger data size that is more optimal for a signal processor to process. For example, a time-domain signal, can be padded by adding a string of zeros or other meaningful values to the data before performing the FFT. This padding can result in an optimal run time for the signal processor.

Described herein are methods that can be used to determine the optimal pad size for a digital signal of data. One method can comprise performing a 2-D FFT operation on a two-dimensional N×N array of data, using a signal processor. The amount of time needed to perform the FFT can be determined, and the time needed and the size of the N×N array of data can be stored. The method can further comprise increasing the size of the two-dimensional array of data points by one in each dimension such that the array comprises a N+1×N+1 array of data. A 2-D FFT operation can be performed on the N+1×N+1 array of data, and the time needed and the size of the N+1×N+1 array of data can be stored. The process of increasing the size of the array by one in each dimension, performing the 2-D FFT, and storing the time and size can be repeated for a number of times. For example, a user can set a predetermined amount of times that the method loops through the process of increasing the array of data, performing a 2-D FFT, determining the amount of time, and storing the results. Thus, the performance of a signal processor can be determined for a range of values for N, ranging from N to N+n, where N an n are arbitrary values that can each be established independently by a user.

According to various embodiments, the method can comprise generating a table of optimal pad sizes from the stored amounts of time needed to perform each 2-D FFT. For example, a graphical display can be generated showing optimal pad sizes relative to corresponding data array sizes. A digital signal can be collected and the size of the collected data signal can be compared to the table of optimal pad sizes to determine an optimal pad size for the collected data signal. In some embodiments, the optimal pad size can be the next largest optimal pad size of the collected data signal. The optimal pad size for the collected data signal can be outputted to a user, printed, displayed, and/or stored. In some embodiments, the method comprises padding the collected data signal to the optimal pad size. The padding can comprise adding one or more zeros to the collected data signal, or adding a replicated copy of the collected data signal to the collected data signal.

In some embodiments, the collected digital signal can already be in an optimal size. Therefore, in some embodiments, the method can comprise comparing the collected data signal to the table of optimal pad sizes to determine if the size of the collected data signal is an optimal size, and if the size of the collected data signal is an optimal pad size, the method can output the optimal pad size to a user and/or indicate that the data signal is of an optimal size.

In some embodiments, a 2-D FFT operation can comprise: (i) performing a 1-D FFT on each row of a two-dimensional array of data to generate transformed data; (ii) performing a matrix transpose operation on the transformed data to form transposed data; and (iii) performing a 1-D FFT on each row of the transposed data resulting from (ii). The resulting time to process steps (i)-(iii) can be stored in a table of optimal pad sizes which table can be used according to various embodiments.

According to various embodiments, the method of the present teachings can be used to optimally improve the performance of a signal processor. After a digital signal is collected, the collected data signal can be compared to the table of optimal pad sizes to determine an optimal pad size to apply. The method can comprise padding the collected data signal to generate an padded data signal of optimal size. The method can further comprise processing the optimally padded data signal at an optimal signal processing rate, using the signal processor.

In some embodiments, provided herein is a method that can determine the optimal pad size by using an estimation algorithm. Once the digital signal has been collected, the dimensions of the collected signal can be compared to known estimated performances. The estimation algorithm can estimate the optimal pad size, for example, by estimating the smallest number of prime factors for Matlab's FFT. From this, the optimal pad size can be computed for a class of signal processors. The estimation algorithm can comprise determining the optimal trade off between the optimal pad size for a one-dimensional FFT, and the transpose operation of a two-dimensional FFT.

BRIEF DESCRIPTION OF THE DRAWINGS

The present teachings will be described with reference to the accompanying drawings.

DETAILED DESCRIPTION OF THE PRESENT INVENTION

Figure 1B:
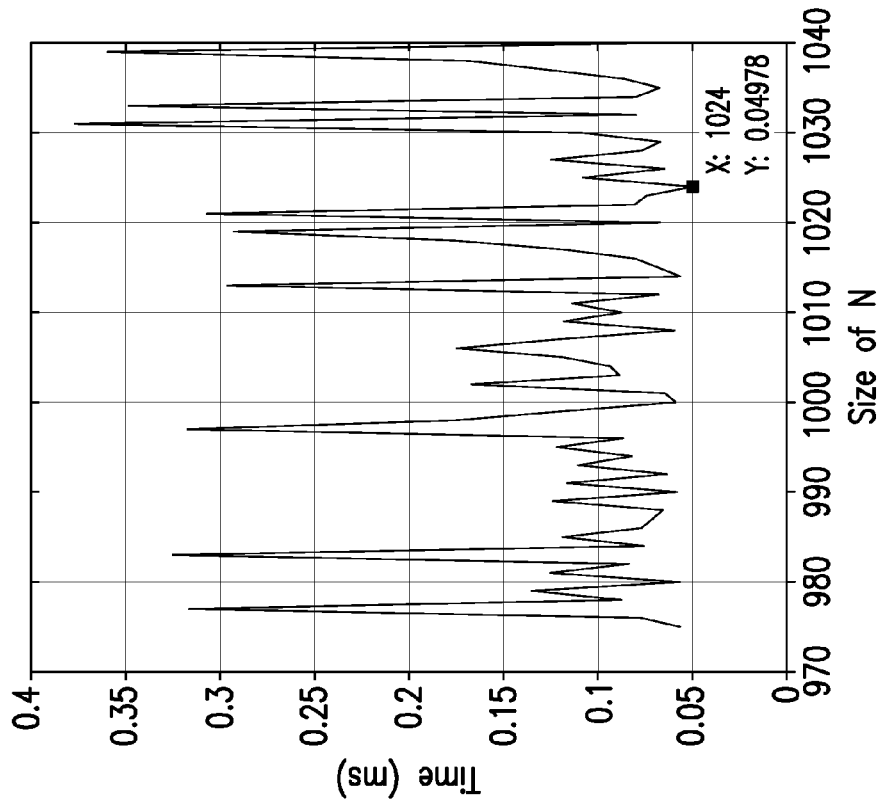
FIG. 1B illustrates a zoomed-in portion of the graph of FIG. 1A, which illustrates in greater detail the time it takes the signal processor to process a signal comprising a one-dimensional array of size N ranging between 970 and 1040, according to various embodiments of the present teachings.

According to various embodiments of the present teachings, provided herein are methods of performing a two-dimensional fast Fourier transform (FFT) on a discretely sampled two-dimensional signal in the minimal amount of run-time on a computer, for example, on a desktop computer. Described herein are methods to determine the optimal pad size to minimize the run time of the FFT for a two-dimensional array of data. The present teachings illustrate how to add to the length of a data signal to perform the FFT calculation in shorter time.

In some embodiments, it is best to pad, that is, increase the length of a signal, by adding arbitrary values to the signal, for example, by adding ones or zeros. In some embodiments, it can be more appropriate to pad the length by using a replicated copy of the signal or some other continuation or extension of the signal. It may seem counter-intuitive that increasing the size of the data, and thus increasing the number of Fourier frequencies that need to be computed, could shorten the computation time. As described herein, however, the run-time of a signal processor is strongly influenced by the architecture of modern computer processors, so that the simple rule of thumb, that a longer calculation should take a longer amount of time, does not hold true for many situations.

According to various embodiments of the present teachings, a method for determining the optimal pad size for a digital signal of data can be used to optimize the performance of one or more signal processors. The method can comprise performing a two-dimensional fast Fourier transform (FFT) operation on a two-dimensional N×N array of data, using a signal processor. The amount of time needed to perform the FFT can be determined, and the time needed and the corresponding size of the N×N array of data can be stored. According to various embodiments, the size of the two-dimensional array of data points can be increased by one in each dimension such that the N×N array can be increased to an N+1×N+1 array of data. A two-dimensional FFT operation can be performed on the N+1×N+1 array of data, and the time needed along with the size of the N+1×N+1 array of data can be stored. The process of increasing the size of the array by one, in each dimension, performing the two-dimensional FFT, and storing the time and size, can be repeated for a number of cycles. For example, a user can set a predetermined amount of times that the method loops through the process of increasing the size of the array of data, performing a 2-D FFT operation, determining the processing time, and storing the results.

According to various embodiments, a table of optimal pad sizes can be generated from the stored amounts of time needed to perform each two-dimensional FFT, relative to the corresponding sizes of the arrays of data points. A digital signal can then be collected and the size of the collected data signal can be compared to the table of optimal pad sizes to determine an optimal pad size for the collected data signal. For example, the optimal pad size might correspond to the pad size to achieve the next largest array size. In some embodiments, the optimal pad size for an N×N array of data might be a data array size that has been increased by 3 data points in each dimension. The optimal pad size for the collected data signal can be outputted to a user, printed, displayed, and/or used in a padding operation. In some embodiments, the method can comprise padding the collected data signal to achieve an optimal sized data array. The padding can comprise adding data to the signal, for example, adding one or more zeros to the collected data signal, or adding a replicated copy of the collected data signal, to the collected data signal.

In some embodiments, the collected digital signal can already be optimally sized. Therefore, in some embodiments, the method can comprise comparing the collected data signal to the table of optimal pad sizes to determine whether the size of the collected data signal is an optimal size. If the size of the collected data signal is determined to be an optimal size, the method can output the optimal size to a user and/or provide a display stating, or notify a user that, no padding is needed. In some embodiments, the two-dimensional (FFT) operation can comprise: (i) performing a one-dimensional FFT on each row of a two-dimensional array of data to generate transformed data; (ii) performing a matrix transpose operation on the transformed data to form transposed data; and (iii) performing a one-dimensional FFT on each row of the transposed data.

According to various embodiments, the methods of the present teachings can be used with various FFT software libraries, for example, the Fastest Fourier Transform in the West, developed at the Massachusetts Institute of Technology, by Mateo Frigo and Steven G. Johnson. The Fastest Fourier Transform in the West (FFTW) can perform a FFT on a fixed-length data signal, on a desktop computer. Other examples include, but are not limited to, the Math Kernel Library (MKL) developed by the Intel Corporation, Santa Clara, Calif., the Engineering Scientific Subroutine Library (ESSL) developed by the International Business Machines Corporation, New York, N.Y., and the JMFFT developed by Jean-Marie Teuler. As will be appreciated, these FFT libraries are given as examples, and the present teachings are not limited to these libraries.

According to various embodiments, the methods of the present teachings can be used to optimally improve the performance and speed of a signal processor. After a digital signal is collected, the collected data signal can be compared to a table of optimal pad sizes to determine an optimal pad size. The method can comprise padding the collected data signal to generate an optimally padded data signal, and in some cases the method can further comprise processing the optimally padded data signal using the signal processor.

In image processing and optical modeling, the 2-D FFT is widely used in numerous applications. Exploiting the optimal 2-D FFT pad sizes can decrease the run-time in Fourier-based applications. A more fundamental re-examination of choosing optimal pad sizes for the 2-D FFT can result in a reduction in run-time of a signal processor as compared with simply using the "optimal" strategy for 1-D data, namely, padding to the next highest power-of-two. Indeed, using the power-of-two padding in 2-D can even result in a longer run-time compared to using no padding at all.

Furthermore, padding a signal for use with the Fast Fourier Transform changes the frequency spacing of the output signal. In some embodiments, obtaining the Fourier transform on the right frequency spacing is more important than optimizing computer run-time, and in such cases the data pad size can be chosen by entirely different criteria, to meet needs related to output frequency spacing. Such pad-size selection based on desired frequency spacing can be used, for example, in simulating optical image formation on a detector at a variety of light wavelengths.

According to various embodiments of the present teachings, a method is provided for that can estimate the optimal pad size of the two-dimensional FFT, without generating a table. The method can comprise estimating the optimal pad size by determining the best tradeoff in time between performing the one-dimensional FFT on the two-dimensional array of data, and performing a matrix transpose operation on the two-dimensional array of data. This method can be less time consuming as compared to the method that comprises performing a two-dimensional FFT on a plurality of arrays of data to generate a lookup table. The method can be coded in computer software and be executed by various software applications, for example, the method can be coded in MATLAB®, developed by MathWorks, Inc., Natick, Mass.

The estimation method can estimate the pad size for a 2-D FFT, which can minimize the average run-time of the signal processor. The result is called the "optimal" pad size for the input data size. This optimal pad size can be used with the Fastest Fourier Transform in the West (FFTW) algorithm, which is a commonly known FFT "engine" in the field of signal processing. The computer architecture can be set associative cache. The optimal pad size for the matrix transpose operation works most efficiently for arrays whose sizes can be factored into prime numbers. For the 1-D FFT, the optimal pad size for the most efficient arrays are those whose sizes are a factor-of-two. For the two-dimensional FFT, the method can comprise the following steps:

(1) perform a 1-D FFT on each row of a 2-D data grid to generate transformed data,
(2) perform a matrix transpose operation on the transformed data generated in step (1), to form transposed data, and
(3) perform a 1-D FFT on the transposed data resulting from step (2).

According to various embodiments, optimizing the 2-D FFT run-time can include optimizing the three steps above. For steps (1) and (3), the optimal runtime relates to the optimal run-time for a 1-D FFT, for example, using padding so that the sizes of the arrays sent to FFTW can be factored to a factor-of-two. For the matrix transpose in step (2), the optimal array size is different. The optimal array size for transposing a matrix are prime numbers, for example, 2, 3, 5, 7, and 13. Thus, it can be seen why simply following the padding rules for a 1-D FFT will not result in the shortest run-time for 2-D FFTs: To maximize the optimization, it is necessary to optimize the 1-D FFTs and the 2-D matrix transposes. For the overall optimal 2-D FFT algorithm, the basic trade is between optimizing the array pad size with prime factors that are small, which can be optimal for the matrix transpose operation, and with prime factors that are greater than 2, which can be optimal for the 2-D transpose. The number of sets in the cache, the number of blocks per set, and the size of each block, can all play an important role in finding the optimal pad size.

According to various embodiments, the present teachings provide a method for optimally improving the performance of a signal processor by estimation. Data collection of a two-dimensional data signal can be used to generate a collected data signal. An estimation algorithm can be performed and can be based on the collected data signal. The estimation algorithm can approximate the ideal tradeoff between loss of processing speed as a result from the 1-D FFT for each row, and the loss of processing speed that comes from the matrix transpose operation. For example, for a data signal the size of N×N, the estimation algorithm can determine the prime factors for N, and can compare those prime factors to a set of prime factors to determine if the size of N is an optimal size, and if not, the estimation algorithm can estimate an optimal size that N can be padded to. The estimation algorithm can be used to determine how much the collected data signal needs to be padded, such that the speed and performance of the signal processor is improved. The method can comprise improving the performance of the signal processor by padding the collected data signal to achieve the optimal data signal size, and to generate an optimal data signal. The optimal data signal can be processed by the signal processor.

Broadly speaking, the cache of a modern computer processor plays an important role in optimizing performance under the assumption of data and instruction locality. For the matrix transpose, instruction locality is satisfied, but for significantly large matrices, data locality is not. Instruction and data locality are described below. The cache is memory used by the computer processor that is smaller but faster than external memory, for example, random access memory (RAM). The cache is typically 10 to 100 times faster than RAM but is often limited to a fraction ($\frac{1}{1000}$) of the size of the external memory.

The cache is intended to hold commonly used instructions and frequently accessed data, so that the processor has the most commonly used information in the most accessible place. The choices for which instructions and for which blocks of data to store in the cache is deterministic, based on the assumption of locality. According to various embodiments, a processor can be configured to decide whether data is stored in the cache or whether data is stored in external memory. In practice, if an instruction or piece of data is needed by the processor, it is typically moved to the cache. Additionally, instructions or data nearby are also transferred to the cache. When data is transferred to the cache, the cache must decide on the location to store the data. A "set-associative" cache partitions the cache into a finite number of sets. Within each set, there is a fixed number of storage blocks. When data is transferred to the cache, it can be placed within any block within a specific set. Most modern processors have some form of a set-associative cache.

In some embodiments, for a set-associative cache, if a processor strides through an array of data by the number of sets, and the length of the data is greater than the number of blocks per set, then the process will repeatedly have a "cache miss." The number of cache misses will depend on how much of the array can fit in all of the blocks of a single set. At a certain size, an array of data becomes too large to fit into the cache. Conversely, for a small enough data array, all, or nearly all, of the data array can be stored in the cache. For situations in between, where some data is stored in the cache and some data is stored in external memory, the method of the present teachings can optimize the performance of the processor.

For example, on a modern desktop computer, access time for a cache is 0.5-25 nanoseconds, and the access time for the main memory is 80-250 nanoseconds. The penalty for a cache miss is the access time of the cache needed to confirm that the data is not in the cache, plus the access time of the main memory. For an array size that is a power-of-two and causes the cache miss as described above, the number of sets used is reduced to one. Thus, the power-of-two is not the most effective operation for the transpose because it inefficiently uses the cache. For array sizes that have larger prime factors (3, 5, 7), the number of sets increases but the data cannot be fit in such a way to utilize every set of the cache. It is only with array sizes that are pure prime numbers that a set-associative cache is used optimally.

According to various embodiments, the method of the present teachings can be used by any signal processor desired. Exemplary signal processors can include, for example, the Intel x86 processors, the Pentium processors, and the Intel Core 2 Duo processors, all manufactured by Intel Corporation, Santa Barbara, Calif., the PowerPC processors manufactured by International Business Machines Corporation, New York, N.Y., and the AMD Athlon processors, manufactured by Advanced Micro Devices, Inc, Sunnyvale, Calif. The processors listed herein are merely examples, and are not meant to limit the type of processor with which the present teachings can be used. In some embodiments, the signal processor can comprise a unique data size for N where the method of the present teachings can be used to optimize the processing speed of the signal processor.

Figure 1A:
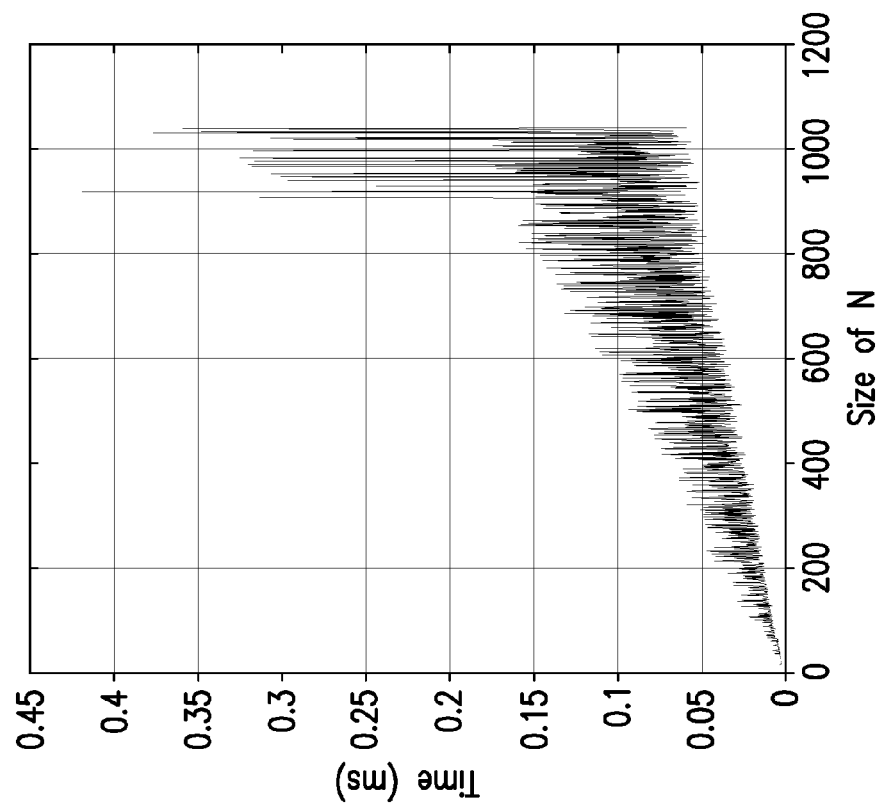
FIG. 1A is a graph of time in milliseconds (ms) versus size (N), which illustrates how long it takes a signal processor to process a signal comprising a one-dimensional array of data the size of N, according to various embodiments of the present teachings.

Various embodiments of the present teachings can be even more fully understood with reference to FIG. 1A which illustrates a graph of time (ms) versus data size (N) showing how long it takes a signal processor to process a signal comprising a one-dimensional array of data having the size of N. As can be seen, for values of N that are below 800, the fluctuation of processing time is not as great as it is for values of N between 900 and 1040. FIG. 1B illustrates a zoomed-in graph of FIG. 1A, which further illustrates the time it takes the signal processor to process a signal comprising a one-dimensional array of size N between 970 and 1040. As shown in FIG. 1B, a one-dimensional data signal having a size N=977 takes approximately 0.32 ms to process, whereas a one-dimensional data signal having a size N=1024 takes approximately 0.05 ms to process. This is consistent with the theory that for a one-dimensional array of data it is optimal to pad the signal to a size that is a factor of two, for example, to pad a size of 977 to a size of 1024.

Figure 2B:
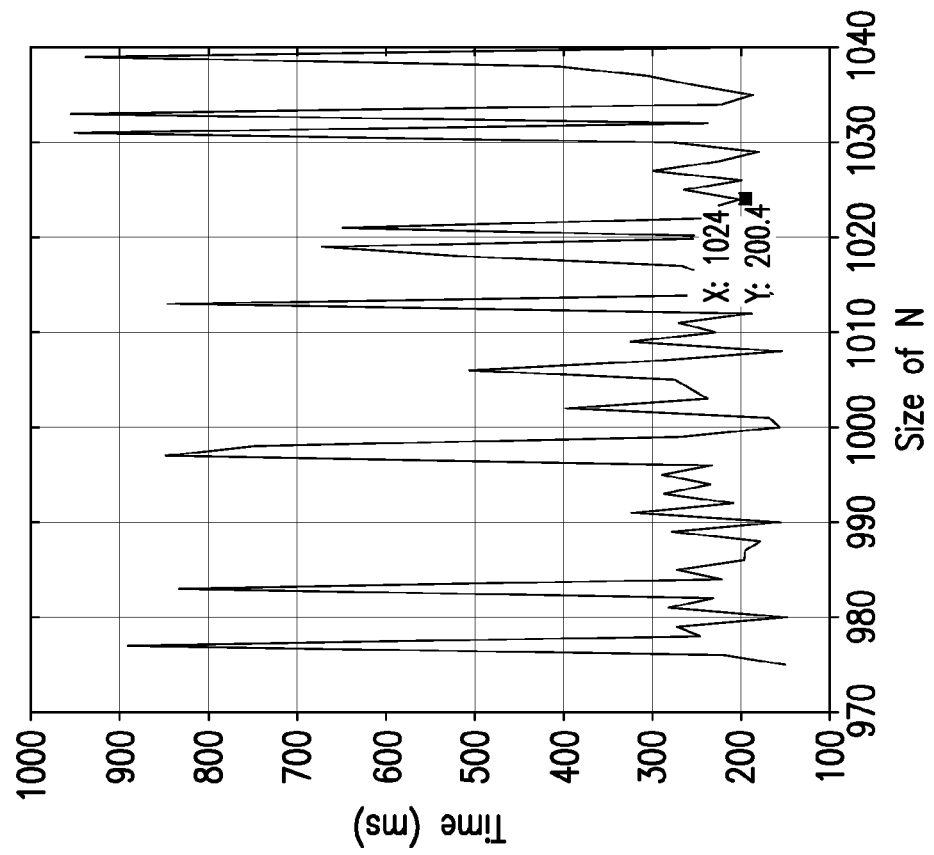
FIG. 2B illustrates a zoomed in graph of FIG. 2A, which further illustrates the time it takes the signal processor to process a signal comprising a two-dimensional array of size N×N ranging between 970 and 1040, according to various embodiments of the present teachings.
Figure 2A:
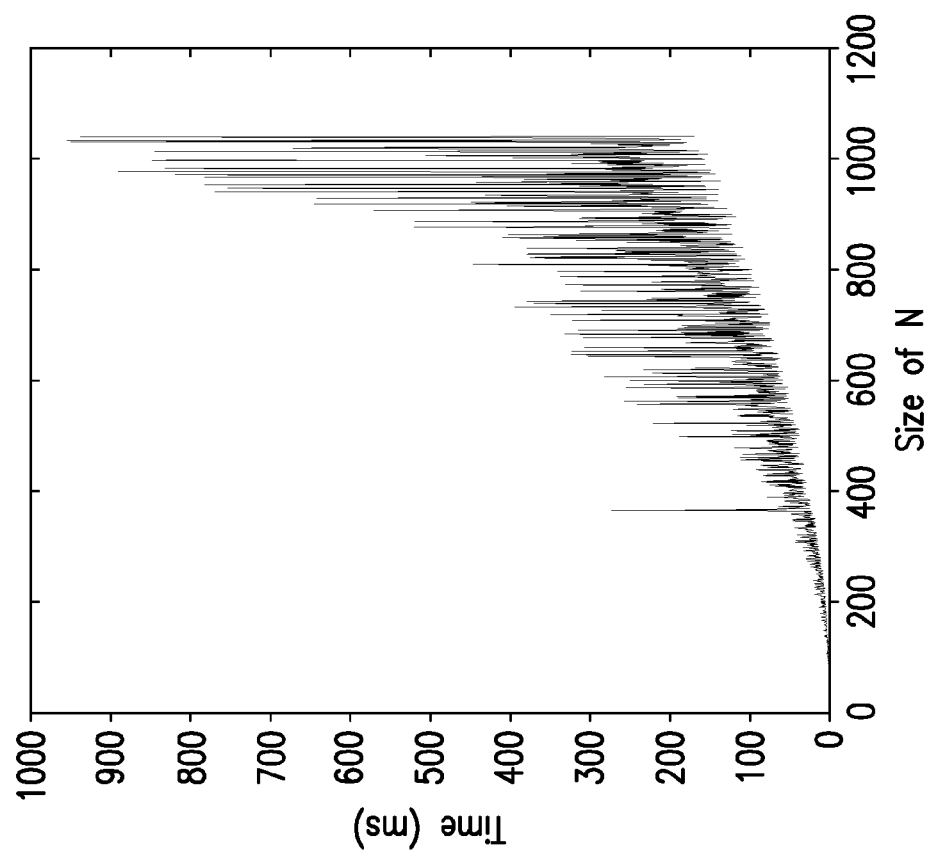
FIG. 2A is a graph of time (ms) versus size (N), which illustrates how long it takes the signal processor to process a signal comprising a two-dimensional array the size of N×N, according to various embodiments of the present teachings.

According to various embodiments of the present teachings, FIG. 2A shows a graph of time (ms) versus size (N), which illustrates how long it takes the signal processor to process a signal comprising a two-dimensional array having a size N×N. As with the data in FIG. 1A and FIG. 1B, the fluctuation of the processor speed is greatest for values of N greater than 900. FIG. 2B illustrates a zoomed-in portion of the graph of FIG. 2A, which even more clearly illustrates the time it takes the signal processor to process a signal comprising a two-dimensional array of size N×N wherein N is a value ranging between 970 and 1040. As shown, a signal comprising an array size of N×N where N=977 takes the signal processor approximately 900 ms to process, whereas a signal comprising a size of N×N where N=980 takes the signal processor approximately 150 ms to process. Thus, to optimize a signal comprising a value of N=977, using this signal processor, the signal should be padded by three to achieve a value of N=980, which would reduce the processing time by nearly 83 percent.

This software builds upon MATLAB and the FFTW. MATLAB is a proprietary software development environment created by The MathWorks, Inc. of Natick, Mass. FTTW was developed at the Massachusetts Institute of Technology by Matteo Frigo and Steven G. Johnson and is described in U.S. Pat. No. 6,975,751 to Pauley et al., and U.S. Pat. No. 6,915,156 to Christini et al., both of which are incorporated herein in their entireties by reference. More about MATLAB can be found at (http://www.mathworks.com). The FFTW is an open source project, based on the GNU General Public License (GPL).

EXAMPLES

An example of software code is presented below. As it will be appreciated, the following code is merely exemplary and the methods of the present teachings are not limited to such code. As shown below, comments that are not apart of the executable code, begin with a percent sign (%).

---

% padsize_min = smallest padsize to avoid aliasing (= 2*pupil samples);
% padsize_max = generally, this would be the smallest padsize that factors as a power of
% two;

```
s = round (padsize_min/2);    % # of pupil samples
n = ceil (log2*s)./log (2));   % Solves: 2^n = 2*s for n (ceil rounds upward)
padsize_max = 2.^n; % smallest padsize that factors as a power of two
if padsize_min == padsize_max     % gives more search options
    padsize_max = 2*padsize_min;
end
% gives more search options in case there are not enough factorizations
if abs (padsize_min - padsize_max) <= 5
    padsize_max = 4*padsize_min;
end
count = 0;
for padsize = padsize_min: padsize_max
    facts = factor (padsize);    % factors for the given padsize
    % limit padsizes to those with factors smaller than 10;
    if floor (facts/10) = = zeros (1, length (facts));
        if isprime (facts) % limit to padsizes factorable by prime numbers;
            count = count + 1;
            % record table with the following columns: [padsize, # prime factors]
            track (count,:) = [padsize, length (facts)].
            % if "display" is any integer, show the range of padsizes
            if count <=10 & nargin > 1
                disp (['padsize =' ,num2str (padsize), 'factors =', num2str(facts)]);
            end
        end
    end
end
% sort according to number of prime factors—samples are first:
track2 = sortrows (track (1:count,:),2);
% sort according to number of padsize—smaller are first:
track3 = sortrows (track (1:count, :),1);
% find smallest padsize with 4 prime factors—4 prime factors seems to be best:
indx = find(track3(:,2)= =4);
if size (indx) = = [0 1]
    % use first padsize if none factor as 4 factors:
    padsize_new = track3(1,1);
else
    % take the smallest padsize nearest "padsize_min" with 4 prime factor to use:
    padsize_new = track3(indx(1),1);
end
% Test for timing:
if 2 = = 1
    tic
    for j = 1:10
    psize = padsize_new;
    a = fft2 (ones(round(padsize_min2)), psize, psize);
    end
    b = toc; disp (['time in sec = ' , num2str(b)])
end
return
```

Other embodiments will be apparent to those skilled in the art from consideration of the present specification and practice of the various embodiments disclosed herein. It is intended that the present specification be considered as exemplary only.

What is claimed is:

1. A method for determining the optimal pad size for a digital signal of data, the method comprising the steps of:
   (a) performing a two-dimensional fast Fourier transform (FFT) operation on a two-dimensional N×N array of data, using a signal processor; wherein the two-dimensional fast Fourier transform (FFT) operation comprises (i) performing a one-dimensional FFT on each row of the two-dimensional array of data to generate transformed data, (ii) performing a matrix transpose operation on the transformed data to form transposed data; and (iii) performing a one-dimensional FFT on each row of the transposed second data resulting from (ii);
   (b) determining the amount of time needed to perform the two-dimensional FFT operation for the N×N array of data;
   (c) storing the amount of time needed and the size of the N×N array of data;
   (d) increasing the size of the two-dimensional array of data points by one in each dimension such that the array comprises a N+1×N+1 array of data;
   repeating the steps of (a), (b), and (c), using the N+1×N+1 array of data;
   repeating the steps of (d), (a), (b), and (c), a predetermined amount of times, with the two-dimensional array of data increasing in size by one in each dimension with each repetition;
   (e) generating a table of optimal pad sizes from the stored amounts of time needed to perform each two-dimensional FFT, relative to the corresponding size of the array of data;
   (f) collecting a two-dimensional digital signal to generate a collected data signal;
   (g) comparing the size of the collected data signal to the table of optimal pad sizes to determine an optimal pad size for the collected data signal; and
   (h) outputting the optimal pad size to a user.

2. The method of claim 1, wherein the comparing further comprises determining the next largest optimal pad size for the collected data signal.

3. The method of claim 1, further comprising padding the collected data signal to the determined optimal pad size.

4. The method of claim 3, wherein the padding comprises adding one or more zeros to the collected data signal.

5. The method of claim 3, wherein the padding comprises adding a replicated copy of the collected data signal, to the collected data signal.

6. The method of claim 1, wherein the step of comparing comprises comparing the collected data signal to the table of optimal pad sizes and determining that the size of the collected data signal is an optimal size that does not need to be padded.

7. A method for optimally improving the performance of a signal processor, the method comprising the steps of:
(a) performing a two-dimensional fast Fourier transform (FFT) operation on a two-dimensional N×N array of data, using a signal processor; wherein the two-dimensional fast Fourier transform (FFT operation comprises (I) performing a one-dimensional FFT on each row of the two-dimensional array of data to generate transformed data, (II) performing a matrix transpose operation on the transformed data to formed transposed data, and (III) performing a one-dimensional FFT on each row of the transposed data resulting from (II);
(b) determining the amount of time the signal processor needs to perform the two-dimensional FFT operation for the N×N array of data;
(c) storing the amount of time needed and the size of the N×N array of data;
(d) increasing the size of the two-dimensional array of data by one in each dimension such that the array comprises a N+1×N+1 array of data;
(e) repeating the steps of (a), (b), and (c) but using the N+1×N+1 array of data;
(f) repeating the steps of (d), (a), (b), and (c), a predetermined amount of times, with the two-dimensional array of data increasing in size by one in each dimension with each repetition;
(g) generating a table of optimal pad sizes from the stored amounts of time needed to perform each two-dimensional FFT, relative to the corresponding size of the array of data;
(h) collecting a two-dimensional digital signal to generate a collected data signal;
(i) comparing the size of the collected data signal to the table of optimal pad sizes to determine an optimal pad size for the collected data signal;
(j) padding the collected data signal to generate an optimally padded data signal; and
(k) processing the optimally padded data signal using the signal processor.

8. The method of claim 7, further comprising padding the collected data signal to the next largest optimal pad size.

9. The method of claim 7, wherein the padding comprises adding one or more zeros to the collected data signal.

10. The method of claim 7, wherein the padding comprises adding a replicated copy of the collected data signal, to the collected data signal.

11. The method of claim 7, wherein the step of comparing comprises comparing the collected data signal to the table of optimal pad sizes and determining that the size of the collected data signal is an optimal size.

* * * * *